(12) United States Patent
Chuang et al.

(10) Patent No.: US 8,983,641 B2
(45) Date of Patent: Mar. 17, 2015

(54) ELECTRONIC DEVICE FOR ACTIVATING AND CONTROLLING USER-CONTROLLABLE FUNCTIONS THEREOF ACCORDING TO AN EARPHONE CONNECTED THERETO, AND ASSOCIATED METHOD

(75) Inventors: Tsung-Jen Chuang, New Taipei (TW); Shih-Fang Wong, New Taipei (TW); Wen-Wu Wang, Shenzhen (CN); Wen-Dong Luo, Shenzhen (CN); Bin Liu, Shenzhen (CN);

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 554 days.

(21) Appl. No.: 13/283,597

(22) Filed: Oct. 28, 2011

(65) Prior Publication Data

US 2013/0044231 A1 Feb. 21, 2013

(30) Foreign Application Priority Data

Aug. 16, 2011 (CN) .......................... 2011 1 0234146

(51) Int. Cl.
*G06F 17/00* (2006.01)
*G11B 19/08* (2006.01)

(52) U.S. Cl.
CPC ...................................... *G11B 19/08* (2013.01)
USPC .......................................................... 700/94

(58) Field of Classification Search
CPC . H04R 1/10; H04R 2201/103; H04M 1/6033; H04M 1/6058; H04S 3/004
See application file for complete search history.

(56) References Cited

U.S. PATENT DOCUMENTS 7,283,635 B1 * 10/2007 Anderson et al. ............... 381/74

* cited by examiner

*Primary Examiner* — Andrew C Flanders
(74) *Attorney, Agent, or Firm* — Novak Druce Connolly Bove + Quigg LLP

(57) ABSTRACT

An exemplary electronic device is connected with an earphone. The earphone includes a first storage unit storing information as to functions of the earphone. The electronic device includes a second storage unit storing a function information table recording information as to user-controllable functions of the electronic device, function units corresponding to the user-controllable functions, an identifying module, and a control module. The identifying module retrieves the information as to functions stored in the first storage unit, and determines whether one or more of the controllable functions of the electronic device are controllable by the earphone. The control module activates all of the function units corresponding to the controllable functions of the electronic device which are controllable by the earphone, and controls one or more of the activated function units according to one or more control signals transmitted from the earphone to the electronic device. A related method is also provided.

15 Claims, 3 Drawing Sheets

| 8th bit | | 7th bit | | 6th bit | | 5th bit | | 4th bit | | 3rd bit | | 2nd bit | | 1st bit | |
|---|---|---|---|---|---|---|---|---|---|---|---|---|---|---|---|
| 1 | 0 | 1 | 0 | 1 | 0 | 1 | 0 | 1 | 0 | 1 | 0 | 1 | 0 | 1 | 0 |
| Volume Adjustment | N | Video Camera | N | Still Photo Taking | N | Information Storage | N | Control By Voice Command | N | Recording Mode | N | Mic Input | N | Music Playing | N |

ELECTRONIC DEVICE FOR ACTIVATING AND CONTROLLING USER-CONTROLLABLE FUNCTIONS THEREOF ACCORDING TO AN EARPHONE CONNECTED THERETO, AND ASSOCIATED METHOD

BACKGROUND

1. Technical Field

The present disclosure relates to an electronic device and a method for activating and controlling user-controllable functions thereof according to information on available functions of an earphone connected to the electronic device.

2. Description of Related Art

A user may enjoy music played by an electronic device via an audio output apparatus such as earphones. Different earphones may have different impedance values. The electronic device identifies the earphones according to the detected impedance value of the earphones, and adjusts a sound output mode of the electronic device to match the earphones. This enables the earphones to provide a better sound output effect.

However, the earphones may also have facility to command other functions of electronic devices that the earphones are connectable to. In other words, the earphones may have an input unit to receive a user's input for controlling (e.g. activating and deactivating) functions of an electronic device such as page flipping, taking a photo, voice dialing and so on. Because the electronic device only detects the impedance value of the earphones connected thereto, the electronic device cannot identify whether the earphones are able to control other functions of the electronic device. Furthermore, even if the electronic device is able to identify that the earphones are able to control other functions of the electronic device, the electronic device typically cannot identify how many such functions are controllable by the earphones. Thus, the electronic device cannot adjust the settings thereof to match the earphones connected to the electronic device and achieve full functionality of the combination of the electronic device and the earphones. In these circumstances, the user may not enjoy all the capability inherent in the electronic device and the earphones, and may be inconvenienced.

Therefore, what is needed is an electronic device and a method which can alleviate the limitations described above.

BRIEF DESCRIPTION OF THE DRAWINGS

The components in the drawings are not necessarily drawn to scale, the emphasis instead being placed upon clearly illustrating the principles of an exemplary electronic device and an exemplary method for activating and controlling user-controllable functions thereof according to an earphone connected thereto. Moreover, in the drawings, like reference numerals designate corresponding parts or sections throughout the views.

DETAILED DESCRIPTION

Figure 1:
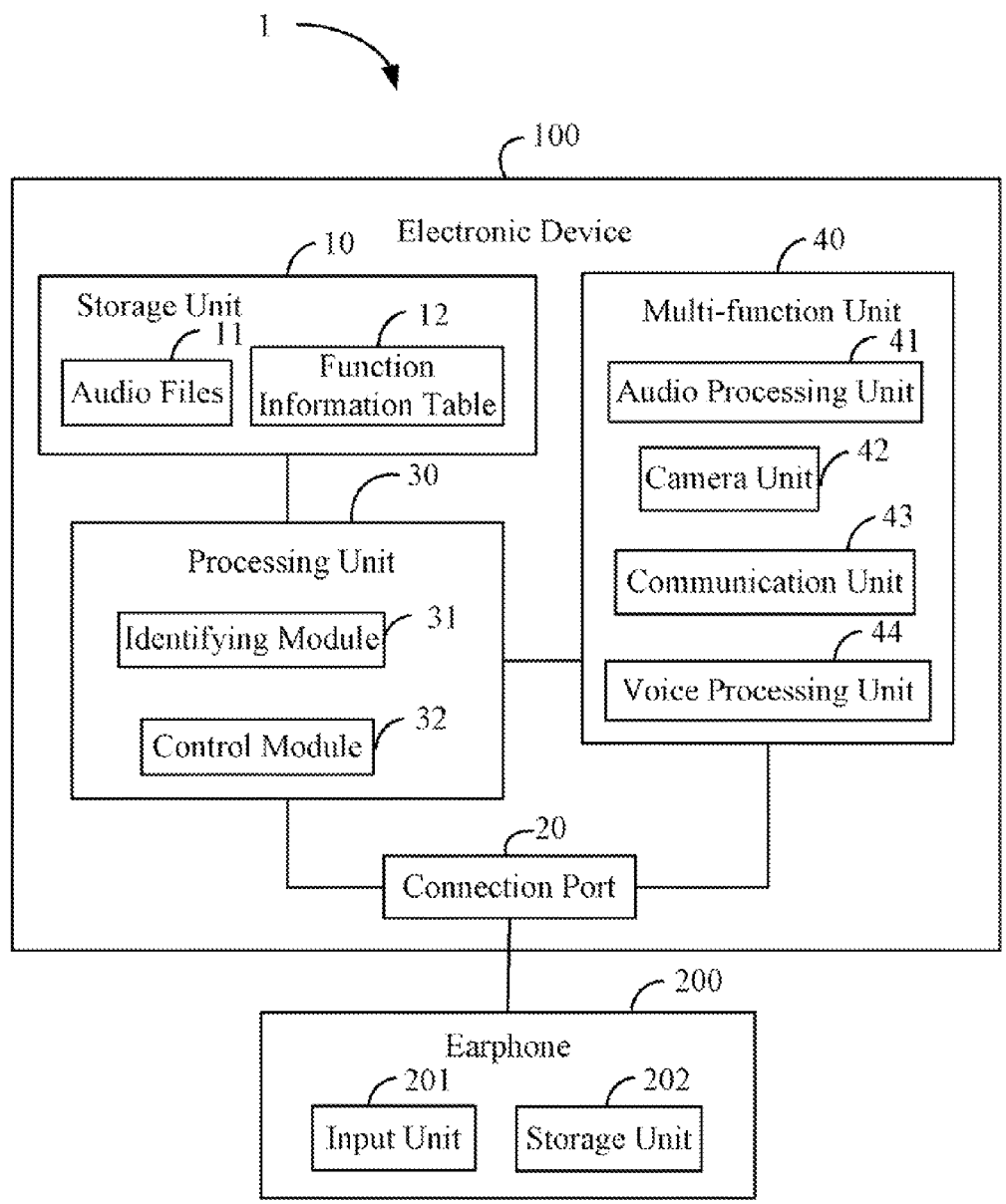
FIG. 1 is a block diagram of an electronic device arrangement including an electronic device and an earphone connected to the electronic device, in accordance with an exemplary embodiment.

Referring to FIG. 1, an electronic device arrangement 1 in accordance with an exemplary embodiment includes an electronic device 100 and an earphone 200 connected to the electronic device 100. In the embodiment, the electronic device 100 is a mobile phone. In alternative embodiments, the electronic device 100 can be a computer, an MP3 (Moving Picture Experts Group, audio layer 3) player, an electronic reader, and the like.

The earphone 200 includes an input unit 201 and a storage unit 202. The input unit 201 is configured to generate control signals in response to user inputs, and to transmit the control signals to the electronic device 100. The input unit 201 can be a keypad or touch pad which includes function keys such as play, pause, stop, skip, speed, record, etc. The input unit 201 also can include a microphone for receiving voice signals from the user. The function keys of the input unit 201 can be mapped according to actual need. The storage unit 202 is configured for recording the functions available for the earphone 200, such functions corresponding to multiple controllable functions of the electronic device 100 and/or any other suitable electronic device. The multiple controllable functions of the electronic device 100 and/or any other electronic device are thus controllable via the input unit 201 of the earphone 200.

In the embodiment, the storage unit 202 of the earphone 200 has information as to the various functions of the earphone 200 recorded therein. The information as to functions of the earphone 200 may be retrieved by the electronic device 100 when the earphone 200 is connected to the electronic device 100. The electronic device 100 also determines which function(s) of the electronic device 100 are controllable by the input unit 201 of the earphone 200, according to the information as to functions of the earphone 200 and the function setup of the electronic device 100. The function setup of the electronic device 100 is determined by the hardware (such as function units) and associated software of the electronic device 100. In this embodiment, the function setup of the electronic device 100 enables the electronic device 100 to activate and control one or more user-controllable functions of the electronic device 100. Upon activation of the user-controllable functions, the user-controllable functions are in a standby mode. Then when the electronic device 100 receives control signals transmitted from the input unit 201 of the earphone 200, the electronic device 100 controls the corresponding activated user-controllable functions accordingly.

In this description, unless the context indicates otherwise, a reference to a "controllable function" is a reference to a "user-controllable function."

Referring to FIG. 1, the electronic device 100 includes a storage unit 10, a connection port 20, a processing unit 30, and a multi-function unit 40. In the embodiment, the multi-function unit 40 includes an audio processing unit 41, a camera unit 42, a communication unit 43, and a voice processing unit 44. In alternative embodiments, the multi-function unit 40 further includes function units such as a browser, a photo editing unit, and the like, which may be installed according to actual needs.

The storage unit 10 stores at least one audio file 11 and a function information table 12. In the illustrated embodiment, there is a plurality of audio files 11.

Figure 2:
FIG. 2 is a table showing a relationship between bits of information as to functions of the earphone stored in a storage unit of the earphone of FIG. 1 and corresponding multiple controllable functions of the electronic device of FIG. 1, in accordance with the exemplary embodiment.

Referring to FIG. 2, the function information table 12 records information as to one or more controllable functions of the electronic device 100, the storage location(s) of the controllable functions, and control relationships related to the controllable functions. The function information table 12 is determined by the function setup of the electronic device 100. Typically, there are multiple controllable functions of the electronic device 100. The multiple controllable functions are the functions of the electronic device 100 which are controllable via the input unit 201 of the earphone 200 or via the input units of other earphones that comply in spirit with the present disclosure.

In the embodiment, the information as to functions of the earphone 200 is stored in the storage unit 202 in the form of sets of 8-bit bytes of data. Each of the bits corresponds to a controllable function of the electronic device 100 (or of any other suitable electronic device). If the value of a bit is "1" (i.e., logic "1"), it means the earphone 200 is able to control that controllable function of the electronic device 100; and if the value of a bit is "0" (i.e., logic "0"), it means that that particular controllable function is not available for the earphone 200. If the 8 bits of the information as to functions are all logic "1", it means the earphone 200 is able to control all of the eight controllable functions of the electronic device 100 which are the subject of the 8-bit set. If the 8 bits of the information as to functions are all logic "0", it means the earphone 200 can not control any of the eight controllable functions of the electronic device 100 which are the subject of the 8-bit set. If some of the 8 bits of the information as to functions are logic "1", it means that the earphone 200 is only able to control those (less than eight) particular controllable functions of the electronic device 100 which are the subject of the 8-bit set.

For example, if the information as to functions stored in the storage unit 202 is "11111111", and the function information table 12 of the electronic device 100 defines music playing, microphone input, recording mode, control by voice command, information storage, still photo taking, video camera, and volume adjustment as the user-controllable functions which correspond to the 8-bit data set, then the input unit 201 of the earphone 200 can exercise control over all those controllable functions of the electronic device 100. If the information as to functions stored in the storage unit 202 is "11111111", but the function information table 12 defines only four controllable functions (for example, music playing, microphone input, control by voice command and volume adjustment) which correspond to the $1^{st}$ bit, the $2^{nd}$ bit, the $4^{th}$ bit and the $8^{th}$ bit respectively, then the input unit 201 of the earphone 200 can control only those four controllable functions of the electronic device 100. If the information as to functions stored in the storage unit 202 is "10000101", and the function information table 12 defines only two controllable functions, namely the $3^{rd}$ bit (recording mode) and the $8^{th}$ bit (volume adjustment), then the input unit 201 of the earphone 200 can only control the volume adjustment of the electronic device 100.

Thus, in this embodiment, the correspondence between the information as to functions stored in the storage unit 202 and the function information table 12 stored in the storage unit 10 determines what particular function(s) of the electronic device 100 can be controlled by the input unit 201 of the earphone 200. The values of the 8-bit data set(s) stored in the earphone 200 may be predefined by the user.

The connection port 20 connects with an audio output apparatus such as the earphone 200. The connection port 20 can be connected to different earphones with different functional capabilities, with the various earphones typically able to control one or more of the controllable functions of the electronic device 100.

The processing unit 30 includes an identifying module 31 and a control module 32. The identifying module 31 is configured for retrieving the information as to functions recorded in the storage unit 202 of the earphone 200, and accordingly determining the user-controllable functions of the electronic device 100 which can be controlled by the earphone 200, wherein the determination is made according to the retrieved information as to functions of the earphone 200 and the function information table 12.

The control module 32 is configured for activating the user-controllable functions of the electronic device 100, and for controlling the activated user-controllable functions according to any control signals transmitted from the input unit 201 of the earphone 200. That is, the control module 32 activates any one or more of the function units of the electronic device 100 and other software of the electronic device 100 associated with the function units, and also controls the activated function units and associated software according to user input.

The audio processing unit 41 is configured for decoding any of the audio files 11 and converting the decoded audio file to analog audio signals. The audio processing unit 41 is also connected to the connection port 20, and transmits the analog audio signals to the earphone 200 via the connection port 20. The audio processing unit 41 may also convert analog voice signals transmitted from the earphone 200 via the connection port 20 to digital signals, and store the digital signals in the storage unit 10.

The camera unit 42 is configured for taking photographs or recording motion according to control signals transmitted from the control module 32. In the embodiment, the camera unit 42 is a camera.

The communication unit 43 is configured for communicating with another electronic device according to control signals transmitted from the control module 32.

The voice processing unit 44 is configured for converting voice signals (in digital form or otherwise) to control commands.

The following are examples illustrating how the electronic device 100 may activate user-controllable functions thereof according to the earphone 200 connected thereto, and how the electronic device 100 may control the activated user-controllable functions thereof according to user input received from the earphone 200. If the information as to functions of the earphone 200 together with the function information table 12 of the electronic device 100 establish that the earphone 200 is able to control one or more controllable functions of the electronic device 100, the control module 32 activates the corresponding one or more function units of the electronic device 100 and the associated software. Then the user of the earphone 200 is able to control any one or more of the activated function units as desired. In all the following examples, the function information table 12 of the electronic device 100 defines all eight controllable functions as illustrated in FIG. 2.

In one embodiment, if the identifying module 31 of the electronic device 100 identifies that the $6^{th}$ or $7^{th}$ bit of the information as to functions stored in the storage unit 202 of the earphone 200 is logic "1", the identifying module 31 determines that the electronic device 100 is controllable via the input unit 201 of the earphone 200 to take still or moving pictures (i.e. video), respectively. The control module 32 then activates the camera unit 42 and corresponding software. Then when the user presses the control keys of the earphone 200 to take still or moving pictures, the input unit 201 transmits the operation signals to the control module 32 of the electronic device 100 via the connection port 20. The control module 32 controls the camera unit 42 according to the operation signals, and stores the still or moving pictures in the storage unit 10. In an alternative embodiment, the electronic device 100 may prompt the user to confirm whether or not the photos or the video should be stored, and stores or deletes the photos or the videos accordingly.

In a second embodiment, if the identifying module 31 of the electronic device 100 identifies that the $5^{th}$ bit of the information as to functions stored in the storage unit 202 of the earphone 200 is logic "1", the identifying module 31 determines that the storage unit 10 of the electronic device 100 is controllable via the input unit 201 of the earphone 200. The control module 32 activates the storage unit 10 of the electronic device 100 and corresponding software. Then when the user presses the appropriate control keys of the earphone 200, the input unit 201 transmits the operation signals to the control module 32. The control module 32 controls the storage unit 10 to store the desired information according to the operation signals. In an alternative embodiment, the electronic device 100 may prompt the user for a password, and verify or not verify the password. After the password is verified, the electronic device 100 may retrieve the desired information which is stored in the earphone 200, and may also store information in the storage unit 202 of the earphone 200 itself.

In a third embodiment, if the identifying module 31 identifies that the $4^{th}$ bit of the information as to functions stored in the storage unit 202 of the earphone 200 is logic "1", the identifying module 31 determines that the electronic device 100 may be subject to voice control via the input unit 201 of the earphone 200. The control module 32 then activates the voice processing unit 44 and corresponding software. If the earphone 200 is equipped with a microphone (as in this embodiment), the electronic device 100 may have a controllable recording function. The identifying module 31 may for example identify the $2^{nd}$ bit of the information as to functions stored in the storage unit 202 of the earphone 200 as logic "1". When the voice control key of the earphone 200 is pressed by the user, the user can speak into the microphone, and analog voice signals are transmitted to the electronic device 100 via the connection port 20. The control module 32 controls the voice processing unit 44 to convert the analog signals to corresponding control commands, and controls the corresponding function units of the electronic device 100 to execute the control commands so given. For example, if the user says to the microphone "please start to record," the analog audio signals are transmitted to the electronic device 100. The control module 32 controls the voice processing unit 44 to convert the analog audio signals into a command to begin recording. The audio processing unit 41 converts the analog audio signals then received by the earphone 200 into digital signals, and stores the digital signals as one or more audio files 11 in the storage unit 10. In an alternative embodiment, the electronic device 100 may prompt the user to select a particular storage path to store the audio files 11, either in the electronic device 100 or in the earphone 200.

By means of the identifying module 31, the electronic device 100 can identify the user-controllable functions thereof which can be controlled by the earphone 200 and automatically activate the corresponding function units and related software when the earphone 200 is first connected to the electronic device 100. In another embodiment, the storage unit 202 of the earphone 200 can further record information as to the type of microphone mounted on the earphone 200, the total impedance value of the earphone 200, and other relevant information on the earphone 200. The electronic device 100 can match the output voltage according to the impedance value recorded. The electronic device 100 can also adjust settings thereof to match the information as to the type of microphone and/or other relevant information on the earphone 200 recorded. In this way, the electronic device 100 achieves the best audio output and input effects.

The control module 32 activates the function units and associated software of the electronic device 100 which correspond to the functions available for the earphone 200 and the function information table 12, and controls the user-controllable functions of the electronic device 100 according to the user signals transmitted from the earphone 200. Thus in many or most instances the electronic device 100 may provide the user with access to all user-controllable functions of the electronic device 100, which is a valuable facility of great benefit to the user.

Figure 3:
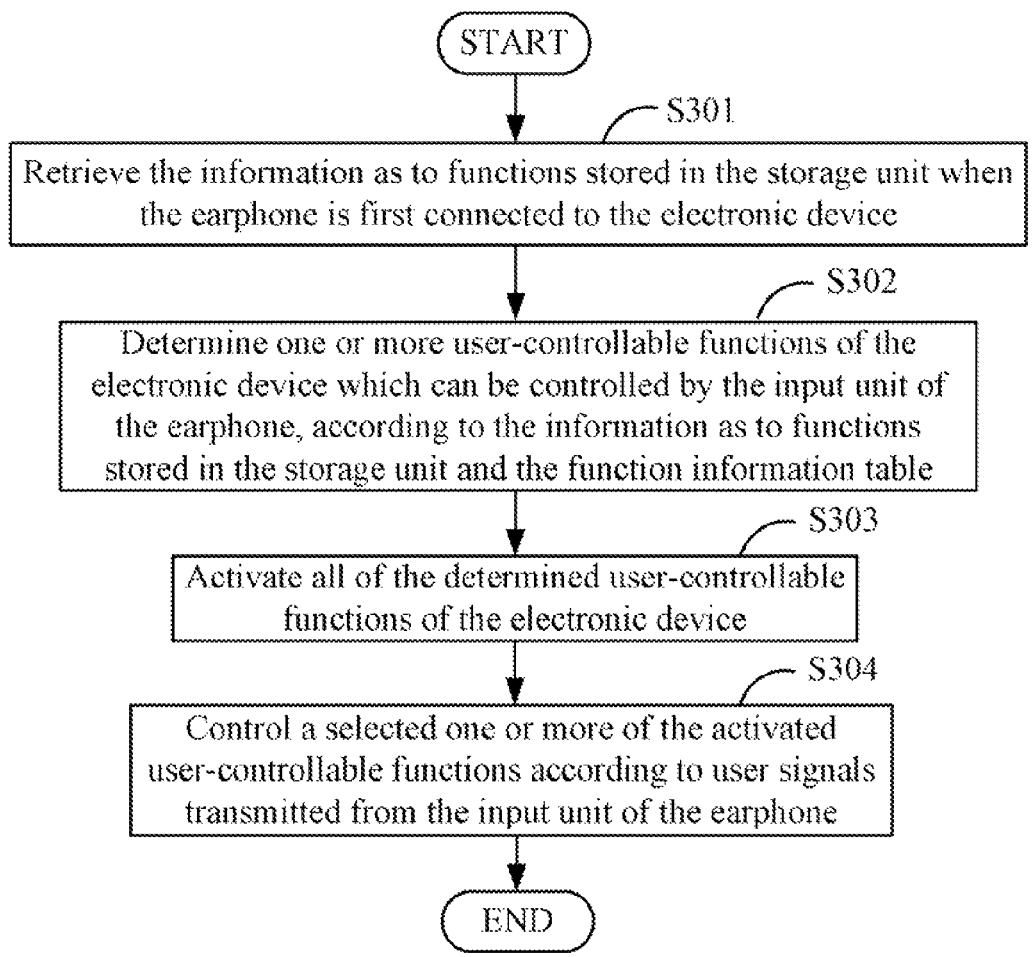
FIG. 3 is a flowchart of a method for activating and controlling user-controllable functions of an electronic device, such as the one of FIG. 1, according to available functions of an earphone connected to the electronic device, in accordance with an exemplary embodiment.

Referring to FIG. 3, a flowchart of a method for activating and controlling one or more user-controllable functions of an electronic device, such as the electronic device 100, is shown. The method includes the following steps, each of which is, for illustrative purposes, tied to the various components contained in the electronic device 100 as shown in FIG. 1.

In step S301, the identifying module 31 retrieves the information as to functions stored in the storage unit 202 when the earphone 200 is first connected to the electronic device 100.

In step S302, the identifying module 31 determines one or more user-controllable functions of the electronic device 100 which can be controlled by the input unit 201 of the earphone 200, according to the information as to functions stored in the storage unit 202 and the function information table 12.

In step S303, the control module 32 activates all of the determined user-controllable functions of the electronic device 100. In the embodiment, the control module 32 activates the corresponding one or more function units of the electronic device 100 and the software associated with the one or more function units.

In step S304, the control module 32 controls a selected one or more of the activated user-controllable functions according to user signals transmitted from the input unit 201 of the earphone 200.

Although the present disclosure has been specifically described on the basis of different embodiments thereof, the disclosure is not to be construed as being limited thereto. Various changes or modifications may be made to the embodiments without departing from the scope and spirit of the disclosure.

What is claimed is:

1. An electronic device for activating user-controllable functions thereof according to an earphone connected thereto, the earphone comprising a first storage unit recording information as to functions of the earphone, the electronic device comprising:

a connection port configured to connect with the earphone;

a second storage unit storing a function information table, the function information table recording information as to one or more user-controllable functions of the electronic device; and a processing unit comprising:

an identifying module configured for retrieving the information as to functions recorded in the first storage unit, and for determining whether one or more of the user-controllable functions of the electronic device are controllable by the earphone according to the information as to functions and the function information table;

a control module configured for activating the user-controllable functions of the electronic device which are controllable by the earphone, and for controlling one or more of the activated user-controllable functions according to one or more control signals transmitted from the earphone to the electronic device; and a multi-function unit comprising a plurality of function units, each of the user-controllable functions corresponding to one or more of the function units; the plurality of function units comprising an audio processing unit, a camera unit, and a communication unit; the audio processing unit being configured for decoding an audio file and converting the decoded audio file to analog audio signals according to control signals transmitted from the control module, the camera unit being configured for taking photographs or recording motion according to control signals transmitted from the control module, and the communication unit being configured for communicating with another electronic device according to control signals transmitted from the control module;

wherein each of the user-controllable functions corresponds to one or more of the plurality of function units, and the control module is further configured to activate all of the function units corresponding to the user-controllable functions of the electronic device which are controllable by the earphone, and also to control one or more of the activated function units according to the one or more control signals transmitted from the earphone to the electronic device.

2. The electronic device as described in claim 1, wherein the function units further comprise a voice processing unit configured for converting voice signals to control commands.

3. The electronic device as described in claim 1, wherein the user-controllable functions are selected from the group consisting of: music playing, microphone input, recording mode, control by voice command, information storage, still photo taking, video camera, and volume adjustment.

4. The electronic device as described in claim 3, wherein the function information table further records the storage location of the controllable functions, and control relationships related to the controllable functions.

5. The electronic device as described in claim 1, wherein the electronic device is selected from the group consisting of a mobile phone, a Moving Picture Experts Group, audio layer 3 (MP3) player, and an electronic reader.

6. An electronic device arrangement comprising:
an earphone comprising:
   an input unit configured to generate operation signals in response to user input; and
   a first storage unit recording information as to functions of the earphone; and
an electronic device, comprising:
   a second storage unit storing a function information table, the function information table recording information as to one or more user-controllable functions of the electronic device;
   a plurality of function units, each of the user-controllable functions corresponding to one or more of the plurality of function units; the plurality of function units comprising an audio processing unit, a camera unit, and a communication unit;
   an identifying module configured for retrieving the information as to functions recorded in the first storage unit when the earphone is connected to the electronic device, and for determining whether one or more of the user-controllable functions of the electronic device are controllable by the earphone by comparing the retrieved information as to functions with the function information table; and
   a control module configured for activating all of the plurality of function units corresponding to the user-controllable functions of the electronic device which are controllable by the earphone, and for controlling one or more of the activated function units according to one or more control signals transmitted from the input unit of the earphone to the electronic device;

wherein the audio processing unit is configured for decoding an audio file and converting the decoded audio file to analog audio signals according to control signals transmitted from the control module, the camera unit is configured for taking photographs or recording motion according to control signals transmitted from the control module, and the communication unit is configured for communicating with another electronic device according to control signals transmitted from the control module.

7. The electronic device arrangement as described in claim 6, wherein the user-controllable functions are selected from the group consisting of: music playing, microphone input, recording mode, control by voice command, information storage, still photo taking, video camera, and volume adjustment.

8. The electronic device arrangement as described in claim 7, wherein the function information table further records the storage location of the controllable functions, and control relationships related to the controllable functions.

9. The electronic device arrangement as described in claim 6, wherein the plurality of function units is selected from the group consisting of: an audio processing unit, a camera unit, a communication unit, and a voice processing unit.

10. The electronic device arrangement as described in claim 6, wherein the electronic device is selected from the group consisting of a mobile phone, a Moving Picture Experts Group, audio layer 3 (MP3) player, and an electronic reader.

11. A method for activating and controlling one or more user-controllable functions of an electronic device according to available functions of an earphone connected to the electronic device, the method comprising:
providing an earphone comprising a first storage unit recording information as to functions of the earphone;
providing an electronic device comprising a second storage unit and a plurality of function units, the plurality of function units comprising an audio processing unit, a camera unit, and a communication unit; the second storage unit storing a function information table, the function information table recording information as to one or more user-controllable functions of the electronic device;
retrieving the information as to functions stored in the first storage unit when the earphone is first connected to the electronic device;
determining one or more of the user-controllable functions of the electronic device which can be controlled by the earphone, according to the retrieved information as to functions and the function information table;
activating all of the user-controllable functions of the electronic device which are controllable by the earphone, and activating one or more of the function units of the electronic device; and
controlling a selected one or more of the activated user-controllable functions according to one or more control signals transmitted from the earphone to the electronic device; the audio processing unit being configured for decoding an audio file and converting the decoded audio file to analog audio signals according to the control signals, the camera unit being configured for taking photographs or recording motion according to control signals transmitted from the control module, and the communication unit is configured for communicating with another electronic device according to control signals transmitted from the control module.

12. The method as described in claim 11, wherein the earphone further comprises an input unit configured to generate the control signals in response to user input.

13. The electronic device as described in claim 1, wherein the user-controllable functions are selected from the group consisting of: music playing, microphone input, recording mode, control by voice command, information storage, still photo taking, video camera, and volume adjustment.

14. The electronic device as described in claim 6, wherein the plurality of function units further comprise a voice processing unit configured for converting voice signals to control commands.

15. The method as described in claim 11, wherein the function units further comprise a voice processing unit configured for converting voice signals to control commands.

* * * * *